United States Patent [19]

Hayashida

[11] 4,435,019
[45] Mar. 6, 1984

[54] BRAKE PRESSURE CONTROL VALVE

[75] Inventor: Yoshihiro Hayashida, Kanagawa, Japan

[73] Assignee: Tokico Ltd., Kawasaki, Japan

[21] Appl. No.: 292,446

[22] Filed: Aug. 13, 1981

[30] Foreign Application Priority Data

Aug. 15, 1980 [JP] Japan .......................... 55/115790[U]
Aug. 15, 1980 [JP] Japan .......................... 55/115791[U]

[51] Int. Cl.³ ............................................... B60T 8/00
[52] U.S. Cl. ..................................... 303/6 A; 303/56
[58] Field of Search ................... 303/6 C, 6 A, 52, 54, 303/56, 84 R

[56] References Cited

U.S. PATENT DOCUMENTS 2,971,799  2/1961  Knecht .................................. 303/54
4,101,176  7/1978  Carre et al. ......................... 303/6 C
4,251,117  2/1981  Kubota et al. ....................... 303/24 F

FOREIGN PATENT DOCUMENTS 824899  12/1959  United Kingdom .................. 303/52

Primary Examiner—Duane A. Reger
Attorney, Agent, or Firm—Wenderoth, Lind & Ponack

[57] ABSTRACT

A brake pressure control valve for controlling the pressure in two pressure circuits. The control valve includes two control valve units arranged side by side in a housing, and each control valve unit comprises a piston and a spring acting on the piston to determining a valve closing pressure. A device for adjusting the spring force of either one of the springs for adjusting the valve closing pressure of one control valve unit with respect to the other control valve unit.

1 Claim, 2 Drawing Figures

4,435,019

BRAKE PRESSURE CONTROL VALVE

BACKGROUND OF THE INVENTION

This invention relates to a brake pressure control valve for use in a vehicle hydraulic braking system.

Conventionally, a hydraulic pressure control valve is provided in an automotive hydraulic braking system for controlling the braking pressure in the rear wheel brake cylinders relative to that of the front wheel brake cylinders such that the pressure in each rear wheel cylinder (RWC) is equal to that in the front wheel cylinders (FWC) when the pressure is below a predetermined level and such that when the pressure exceeds the predetermined level the pressure in RWC increases at a reduced rate as compared with the pressure in FWC. The predetermined level is usually referred to as the split pressure. Such control valves usually comprise a piston having a valve seat or a valve member, and a spring urging the piston in the valve opening direction. When the pressure acting on the piston exceeds the split pressure, the piston displaces against the force of the spring thereby closing the valve.

Japanese Patent Disclosure (Kokai) No. 54-155531 shows a brake pressure control valve of the kind described, wherein a pair of valve units are arranged side by side in a housing, and the valve units control the pressure in separate pressure circuits. A single spring acts commonly on respective pistons of the valve units through a common spring seat. The construction is compact and simple and the operation of the valve is generally satisfactory. However, there are shortcomings such as that the frictional resistance in the respective pistons may not necessarily be equal to each other and the locations at which the common spring seat contacts the respective pistons may differ from each other, whereby it is difficult to equalize the split pressure in the respective pressure circuit. In hydraulic braking system having separate pressure circuits. In left and right rear wheel cylinders are usually connected to respective pressure circuits and, therefore, in the foregoing case the braking force in the left and right rear wheels can not be balanced.

The brake pressure control valve disclosed in the Japanese Patent Disclosure further provides a countermeasure for compensating for the failure in either of the pressure circuits, wherein the spring seat is guided on a tapered guide rod for allowing the inclination of the spring seat, and a stop is provided on the guide rod for restricting the relative axial displacement of the spring seat when the spring seat inclines with respect to the guide rod upon the failure in one pressure circuit.

It will be noted that there are many proposals for brake pressure control valves wherein two pistons are arranged in line; however, the overall length thereof is relatively great, and there is a problem in installation.

SUMMARY OF THE INVENTION

An object of the invention is to overcome the shortcomings described above and to this end the brake pressure control valve according to the invention comprises a pair of control valve units arranged side by side in a housing. Respective valve units have pistons for controlling fluid flow between respective inlets and outlets and respective springs acting on respective pistons. At least one of the springs is adjustable so that the split pressures of the respective valve units which are determined by the spring load of the respective springs can be relatively adjusted as desired.

According to one feature of the invention a rockable lever extends between the two pistons and is interposed between respective pistons and respective springs, and the rocking movement of the lever is restricted by a stop thereby compensating for the decrease in the braking force when failure occurs in either one of the pressure circuits.

Further objects and advantages of the invention will become apparent from the following description taken in conjunction with the accompanying drawings which exemplifies one preferred embodiment of the invention.

DETAILED DESCRIPTION OF THE PREFERRED EMBODIMENT

Figure 1:
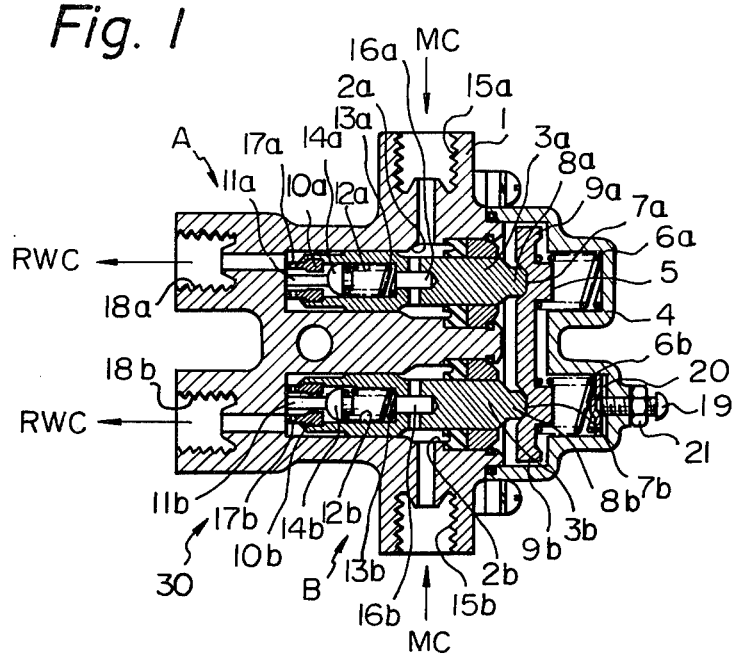
FIG. 1 is a longitudinal sectional view of a brake pressure control valve according to the invention.

The brake pressure control valve 30 shown in FIG. 1 comprises a main body or a housing 1 having two parallel stepped bores 2a and 2b. The bores 2a and 2b slidably receive pistons 3a and 3b therein respectively. Since the bores 2a and 2b and pistons 3a and 3b are identical with one another, a description will be given only of control valve unit A comprising the bore 2a and the piston 3a, and the description of control valve unit B in the lower part of the drawing is omitted.

The piston 3a is urged in the leftward direction as seen in the drawing by a coil spring 6a which is disposed between a cover 4 and a balance lever 5. When the piston 3a is in the leftward-most position, a small diameter portion of the piston 3a is located in the large diameter portion of the bore 2a, and a large diameter portion of the piston 3a is slidably fitted in the small diameter portion of the bore 2a. The lever 5 is rockingly disposed in the cover 4 and straddles the pistons 3a and 3b. A spring 6a is disposed between the cover 4 and the lever 5 to act on the piston 3a through the lever 5. A recess 7a is formed in the lever 5, and a projection 8a is formed on the outer end of the piston 3a to rockingly engage with the recess 7a. On the upper distal end of the lever 5, there is provided a projection 9a which is adapted to engage with the cover 4 when the lever 5 rockingly moves a predetermined amount. Thus, the projection 9a acts as a stop restricting the rocking movement of the lever 5.

An annular valve seat 10a is provided adjacent to the inner end (the left end as seen in the drawing) of the piston 3a, and the valve seat 10a cooperates with a valve member 14a which is provided in an axial bore 12a in the piston 3a and is urged leftward by a spring 13a. In the normal inoperative condition shown in the drawing, the valve member 14a abuts a rod 11a secured to the housing 1 so that the valve member 14a is spaced from the valve seat 10a. At that condition an inlet port 15a communicates with an outlet port 18a through an annular space defined between the small diameter portion of the piston 3a and the large diameter portion of the bore 2a, a passage 16a in the piston 3a, the axial bore 12a in the piston 3a, the space between the valve member 14a and the valve seat 10a, and openings 17a in the piston 3a. The inlet port 15a is connected to a source of hydraulic pressure such as one of outlet ports of a tandem master cylinder (not shown), and the outlet port 18a is connected to brake cylinders or a brake cylinder (not shown) of the left rear wheel of an automotive vehicle. The inlet port 15b of the valve unit B is connected to another outlet port of the tandem master cylinder and the outlet port 18b is connected to brake cylinders or a brake cylinder of the right rear wheel of the vehicle. The valve unit B differs from the valve unit A in that the spring 6b is provided between the lever 5 and a spring retainer 20, and an adjusting bolt 19 threadingly engaging with the cover 4 abuts the spring retainer 20 so that the spring load of the spring 6b can be adjusted by the adjusting bolt 19. A lock nut 21 maintains the adjusting bolt 19 at the adjusted position.

Figure 2:
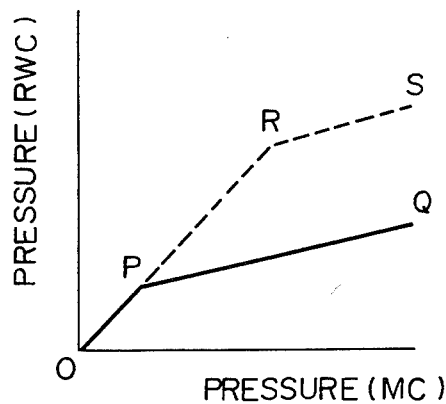
FIG. 2 is a diagram showing the operational characteristics of the valve of FIG. 1.

The operation of the brake pressure control valve 30 having the aforesaid constitution will now be explained. When pressurized liquid is supplied to inlet port 15a, at the same time, pressurized liquid is also supplied to the valve unit B which acts similar to the valve unit A, the pressure MC in the master cylinder is transmitted to the rear wheel cylinder through the passage 16a, the clearance between the valve seat 10a and the valve member 14a, and through the outlet port 18a when the pressure MC is lower than the split pressure P (FIG. 2). When the pressure MC increases to the split pressure P, the pressure acting on the piston 3a overcomes the force of the spring 6a to move the piston 3a rightward so that the valve member 14a engages with the valve seat 10a thereby blocking the communication between the inlet and outlet ports 15a and 18a.

Thereafter, when the pressure MC increases further, the piston 3a moves leftward a small amount to separate the valve member 14a and the valve seat 10a. A small amount of liquid flows to the output port 18a and the pressure in the outlet port 18a increases by a small amount thereby moving the piston 3a rightwards to again close the valve. The pressure in the outlet port 18a acts on the circular area defined by the large diameter portion of the piston 3a and, in the valve closed condition, the pressure force is equal to the force of the spring 6a plus the pressure force of MC acting on the annular area defined by the large and small diameter portions of the piston 3a. Thus, the pressure to the RWC increases at a reduced rate as compared with the increase in the pressure of MC and along the line PQ in FIG. 2.

If the split pressure P in the control valve unit A differs from that in the control valve unit B, the pressure in the RWC for valve unit A differs from that for the valve unit B. The braking force on the left and right rear wheels will not be balanced. According to the invention, it is possible to adjust the spring force of the spring 6b by turning the adjusting bolt 19, thereby changing suitably the split pressure of the valve unit B with respect to the valve unit A.

In the embodiment, the lever 5 is interposed between the piston 3a and the spring 6a and between the piston 3b and the spring 6b. However, the lever 5 may be omitted. Further, an adjusting mechanism comprising the adjusting bolt 19 is provided on the valve unit B. However, similar adjusting mechanism may also be provided with respect to the valve unit A.

According to a further feature of the invention, the pressure control valve 30 shown in FIG. 1 is effective to compensate for the decrease in the braking force when failure occurs in either of the pressure circuits. Assuming that the control valve unit A is not supplied with pressurized liquid due to a condition such as leakage in the pipe line or the like, the piston 3a is maintained at the non-actuated position shown in the drawing. Thus, when the piston 3b in the valve unit B moves rightward in response to the pressure MC supplied to the inlet port 15b, the lever 5 rockingly moves around the contacting point between the lever 5 and the piston 3a and in the counterclockwise direction as viewed in the drawing. The clearance between the projection 9b on the lever 5 and the cover 4 is such that the projection 9b engages with cover 4 when a predetermined pressure lower than the split pressure P is supplied to the inlet port 15b.

When the projection 9b engages the cover 4, further counterclockwise rocking movement of the lever 5 is prevented and, thereafter, the lever 5 rotates around the projection 9b in the clockwise direction so that the force of the spring 6a also acts on the piston 3b. The valve unit B closes at a split pressure R (FIG. 2) which is higher than the pressure P. Thereafter, the increase in the pressure in the outlet port 18b is depicted by line RS in FIG. 2. Thus it is possible to compensate the braking force when one of pressure circuits has failed.

In the embodiment, the projections 9a and 9b are provided on the opposite ends of the lever 5. However, the projections may be provided on the inner surface of the cover 4.

As described heretofore, the pressure control valve has a very simple construction, is reliable in operation, and it is possible to adjust the split pressure between the two control valve units and to compensate the braking force upon a failure in either of the pressure circuits.

What is claimed is:

1. A pressure control valve for limiting pressure supplied from a source of pressure to wheel brake cylinders, comprising:
   a housing;
   a pair of control valve units side by side in said housing, each valve unit having means to connect it to a respective source of pressure and to a respective wheel brake cylinder, and each having a piston valve member and a spring urging the piston valve member in the valve opening direction, each said valve unit transmitting pressure from the corresponding source of pressure directly to the wheel brake cylinder when the corresponding pressure is below a predetermined split pressure which is determined by the force of the respective spring and, when the pressure in the corresponding source of pressure exceeds the split pressure, the pressure transmitted to the respective wheel brake cylinder increases at a reduced rate as compared with the increase of pressure in the corresponding source of pressure;
   a lever within said housing and extending across the ends of said pistons and being pivotally engaged only with said pistons, said springs being between said housing and the opposite side of said lever from the respective pivotal engagement points of said lever and said pistons;
   stop means at each end of said lever between said lever and said housing for limiting the rocking movement of said lever relative to said pistons to a predetermined amount; and
   adjustment means engaged with at least one of said springs for adjustment of the spring force for adjusting the split pressure in said control valve unit corresponding to said one spring.

* * * * *